UNITED STATES PATENT OFFICE.

FRITZ HABER AND GABRIEL VAN OORDT, OF KARLSRUHE, AND FRIEDRICH BRAN, OF MANNHEIM, GERMANY.

PROCESS OF MAKING BERYLLIUM HYDROXID.

No. 822,444.　　　　　Specification of Letters Patent.　　　Patented June 5, 1906.

Application filed March 8, 1904. Serial No. 197,199.

*To all whom it may concern:*

Be it known that we, FRITZ HABER and GABRIEL VAN OORDT, residing at Karlsruhe, and FRIEDRICH BRAN, residing at Mannheim, in the Grand Duchy of Baden, Empire of Germany, subjects of the German Emperor, have invented certain new and useful Improvements in the Manufacture of Beryllium Hydroxid, of which the following is a specification.

Our invention relates to the separation of beryllium compounds, such as the hydroxids from mixtures of such compounds as found, for example, in minerals.

The object of the invention is to provide a method of obtaining the beryllium compounds, and in particular beryllium hydroxid, by an economical and commercially available manner.

With these objects in view our invention consists in the methods, steps, and features now to be described, and to be pointed out in the claims.

Although the behavior of the beryllium hydroxid with respect to alkalies and acids has often been the subject of experiment since the discovery of the metal by Vauquelin, the qualities of beryllium hydroxid, which are described in this specification and which are to be employed for separating beryllium hydroxid from other hydroxids, especially from those of iron and aluminium, have remained unknown.

The discoverer of beryllium, Vauquelin, (*Ann. Chim. Phys.* I, 26, 1798, p. 155 and 170) characterizes beryllium hydroxid as a substance which is less easily dissolved in caustic potash than alumina, ($Al_2O_3$.) Graf Schaffgotsch and C. G. Gmelin (Pogg. *Ann.* 50, 1840, pp. 175 and 185) discovered independently that when the hydroxid is dissolved in strong caustic potash and the solution is then diluted said hydroxid is precipitated by heating. C. G. Gmelin says that this property of beryllium hydroxid is not shared by alumina and proposes to utilize this quality for separating both earths by dissolving them together in strong caustic potash and then diluting and boiling the solution. This suggestion of Gmelin has been characterized as impracticable by Weeren (Pogg. *Ann.* 92, 1854, p. 91) both for analytical and technical purposes, because the latter found by experiment that at times more than three-fourths of the beryllia remains in solution. Debray (*Ann. Chim.* 3, 34, 1855, p. 5) likewise condemns the process as technically impracticable. Hofmeister (*Journal pr. Chem.* 76, 1859, p. 3) and Joy (*Journal pr. Chem.* 92, 1869, p. 230) likewise found this method of separation impracticable. Zimmermann (*Dissertation*, Berlin, 1887) worked with caustic potash and caustic soda according to the suggestion of Gmelin and found that caustic soda is not to be recommended for the separation of the beryllium compound. (Zimmermann lost seven per cent. of the beryllia.) With caustic potash he could obtain a separation only under such conditions as excluded all use on a larger scale. His method being characterized as highly unreliable and the conditions and steps of the same being insufficiently described, it cannot even be repeated on a small scale. (He dissolved only one gram of the mixed hydroxids per liter. He says that by diluting the solution to double the extent fifty-eight per cent. of the alumina was precipitatetd. The concentration of the alkali is not given at all.)

Penford and Harper (Classen, *Ausgewählte Methoden* I, Braunschweig, 1901, p. 717) desired to effect the separation by dissolving the earths in very concentrated caustic soda, diluting the solution to eight hundred cubic centimeters and boiling. This method also is technically impracticable and cannot be repeated with certainty of success. This is made all the more evident through a statement of Hantzsch, (*Zeitschrift f. Anorg. Chem.* 30, 1902, p. 338,) who says that a solution containing one molecule of beryllium oxid to eight molecules of caustic soda gives a precipitate which is always far from complete.

Gmelin's method above described therefore appears to be impracticable according to the statements of subsequent investigators and has been criticized on this score by authors of text-book—for example, by Graham-Otto and Treadwell.

The proposed method of Gmelin is based entirely on the observation that beryllia is precipitated if its diluted solution in caustic alkali is boiled. Of the precipitated beryllia Gmelin states that it dissolves with difficulty in dilute caustic potash, but very readily in acids, and that the particular form which dissolves in a dilute solution of caustic potash with difficulty can only be produced in this way.

Our researches and investigations in this direction have given the following surprising results: First, that the particular form of beryllia, or rather beryllium hydroxid, which is difficult to dissolve in a dilute caustic-potash solution becomes changed to another form, which at ordinary temperatures dissolves with difficulty even in strong acids and in dilute acids is almost insoluble at such temperatures if the beryllia is boiled with the liquid for some time after its precipitation has taken place; second, that both forms of the precipitated beryllium hydroxid by heating with a small quantity of caustic potash quite insufficient for dissolving it are converted into this new form, which is almost insoluble or dissolves with difficulty in acids at ordinary temperatures; third, that other forms also difficult of solution result if a mixture of beryllia and other oxids, such as alumina in the form of hydroxids, is treated with a quantity of caustic soda (in suitable concentration) sufficient to dissolve the alumina, but not the beryllia; fourth, that the forms of beryllium hydroxid practically insoluble in alkali may also be produced by treating beryllium hydroxid at ordinary or at higher temperatures by boiling with pure water or with water containing ammonia, carbonates of alkali, or even indifferent substances, which has been expressly denied by C. G. Gmelin; fifth, finally it was found that the treatment with water, steam, or solutions as above may be replaced by mere drying.

Thus, for instance, it was found for the solubility of a beryllium hydroxid which had been dried for eight days at ordinary temperature that at from 20° to 23° centigrade there would dissolve in a half-normal, a normal, or a double-normal solution of NaOH, respectively, sixty, one hundred and seventy, or five hundred and seventy milligrams per liter, and at 100° centigrade these solubilities were found to be, respectively, eighty, two hundred and ninety, or one thousand and twenty milligrams per liter. On the other hand, for alumina which had stood for more than one year at ordinary temperature these solubilities for the same solutions and temperatures were found to be respectively, 9.26, 11.39, 14.4, 11.25, 20.3, or 44.4 grams per liter. This is expressed in a more perspicuous form in the following table:

| Temperature | BeO. | | | NaHO solution. |
|---|---|---|---|---|
| | in n/2. | n. | 2n. | |
| 20°–23° C | 60 mg. | 170 mg. | 570 | mg. per liter. |
| 100° C | 80 mg. | 290 mg. | 1,020 | mg. per liter. |
| | Al$_2$O$_3$. | | | |
| 20°–23° C | 9.26 g. | 11.39 g. | 14.4 g. | per liter. |
| 100° C | 11.25 g. | 20.3 g. | 44.4 g. | per liter. |

Furthermore, it has been found for the solubility of beryllium hydroxid, which has been heated during five hours in pure water at 100° centigrade, that fifty-two milligrams were soluble in one liter of half-normal caustic-soda solution. In the case of the use of water containing ammonia substantially the same values were obtained under similar conditions.

On the other hand, if alumina is heated for the same time with a quantity of half-normal caustic-soda solution, insufficient for solution of the alumina, the remaining part may be dissolved in a new quantity of caustic soda as easily as if that treatment had not preceded.

The beryllium hydroxid undergoes an alteration under the influence of time, whereby from the well-known form which readily dissolves in dilute alkali solutions in solutions of carbonates of potassium of sodium and of ammonium and acids "aged" forms arise which are insoluble, or only soluble with difficulty not only in alkalies, but also in acids. The increase in temperature and also the addition of caustic potash and caustic soda and the like exert an accelerating influence on this ageing effect.

Aluminium hydrate, ferric hydrate, and some other hydroxids also possess the property of changing to an aged form, as Berthelot (*Ann. Chim. Phys.* 5, 4 vol. p. 174) and Hantzsch (*Zeitschrift f. Anorg. Chem.* 30, 1902, p. 38) have observed, but neither to the same extent nor under the same conditions as the beryllium hydroxid.

In order to emphasize the great differences between fresh and aged forms of hydroxids, the solubilities for freshly-precipitated beryllium hydroxid at the ordinary temperature in caustic soda of different degrees of concentration will now be given, these particulars having been partly communicated by Rubenbauer (*Zeitschrift f. Anorg. Chem.* 30, 1902, p. 331) and having in part been ascertained by our own researches.

| Milligrams caustic soda per liter. | Grams BeO dissolved per liter. |
|---|---|
| 3770 | 39.54 |
| 1990 | 16.32 |
| 1460 | 12.25 |
| 780 | 4.975 |
| 649 | 3.6 |
| 540 | 2.92 |
| 540 | 2.50 |
| 483 | 1.69 |
| 383 | 1.64 |
| 388 | 1.53 |
| 386 | 1.45 |
| 390 | 1.24 |

Our invention utilizes the newly-discovered facts above set forth, and one feature of the same accordingly consists in heating undissolved beryllium hydroxid either alone or in an aqueous bath which may be simply water or a solution of caustic alkali, including ammonia, or of alkali carbonates. A further feature of our invention involves the treatment of mixtures containing beryllium oxid after having been thus reacted on with acids to separate the compounds soluble in the acid from the beryllium hydroxid which has become almost insoluble or soluble with difficulty in the acid.

A number of examples showing the preferred manner of proceeding under our invention will now be given.

Example 1: A mixture of hydrates of beryllium, aluminium, and iron is heated in so much diluted (for instance, n/2) caustic soda as is necessary to dissolve the alumina. If, for instance, thirteen grams BeO in the form of beryllium hydroxid, seventeen grams $Al_2O_3$ in the form of aluminium hydroxid, one gram $Fe_2O_3$ in the form of ferric hydrate are mixed together, this mixture is heated with 1.5 to 1.6 liters of half-normal caustic soda for one or two hours. Hereby at the most 0.1 gram BeO is dissolved in the form of $Be(HO)_2$,—that is to say, 0.75 per cent. of the existing beryllia—whereas the alumina is completely eliminated. The remainder of the beryllium hydroxid is now present in a form which is difficult to dissolve and is freed from iron by simply washing it with acid—for instance, with warm dilute hydrochloric acid.

Example 2: Instead of heating the mixed hydroxids with alkali they may be heated in an aqueous bath—that is to say, with water—with an aqueous solution of ammonia or with a solution of soda or of carbonate of potassium, with or without indifferent substances added to such liquids or solution. The heating with water may be carried out, for instance, in such a manner that the mixture of hydroxids set forth in Example 1 is treated in damp condition with water or steam of 100° centigrade or at a somewhat higher temperature for about five hours. The beryllium hydroxid thereby becomes almost completely insoluble in alkali, as seen from the above table of solubilities. If then the mixture is treated with so much dilute (for instance, half-normal) caustic soda, as is necessary for dissolving the alumina according to the above-mentioned example, the alumina is extracted from the mixture by being dissolved. If this extraction of alumina is carried out at higher temperatures sufficient to cause the caustic alkali simultaneously to change the beryllium compound into the aged form, as above shown, the iron may then be eliminated by means of acid, as mentioned in the preceding example. If it is desired to affect the extraction in the cold and then to eliminate the iron by means of acid, it may be necessary to continue for a longer period the preceding treatment with steam or hot water in order that by this treatment the condition in which it is difficult to dissolve the beryllia in acid may be perfectly obtained.

Example 3: The process is the same as that in Example 2, with the exception that the treatment with water, steam, or solution is replaced by a drying process carried out at ordinary or higher temperatures.

In all these processes the presence of such hydroxids as will remain easily soluble in diluted alkali or in acid is permissible.

To apply this process to beryl or similar minerals containing beryllium, the solution obtained during the process—for example, a solution of acid salts of alumina, of beryllia, and of iron—is mixed with so much caustic alkali that only the alumina is held in solution, and then the process is carried out according to the directions given under Example 1, or caustic alkali or soda is added to such solution only up to the point of neutralization and the process is then carried out according to Examples 1, 2, or 3. If, however, an alkaline-fused mass or an alkaline solution is to be treated, the process may be so carried out that the quantity and the degree of concentration of the alkali fulfil the conditions of Example 1, whereupon we proceed according to said Example 1. In the case of weaker alkalinity we follow either Example 1, 2, or 3.

As compared with Gmelin's process referred to above, our invention offers the important advantage that the aluminate solution may be regenerated without evaporation by a simple treatment with chalk after the precipitation of the alumina by means of carbonic dioxid. When obtained in this manner, the berryllium hydroxid often contains small quantities of ferric hydrate and alumina. In order to eliminate these, we proceed in the following manner:

As Lacombe (*Comptes Rendus*, vol. 133, p. 874, 1901) has found, beryllia readily forms compounds with simple fatty acids, which are soluble in chloroform. Our experiments in this connection have proved that this quality may be utilized for the separation of the beryllia from alumina and iron. For this purpose the compounds which are to be separated are transformed into acetates, treated with glacial acetic acid and extracted by chloroform, whereby perfectly-pure beryllium acetate is obtained, which may be utilized for the manufacture of other beryllium compounds. If, for instance, there are to ten parts of BeO (in form of $Be(OH)_2$) one part of $Al_2O_3$ and of $Fe_2O_3$, (in the form of the hydroxids,) they are dissolved in acetic acid of any concentration. The liquid is then evaporated and stirred up with glacial acetic acid, heated until dry, the atmospheric humidity being excluded (by distilling off the glacial acetic acid) and extracted with chloroform. In driving off the chloroform ninety per cent. of the employed BeO are obtained immediately pure in the form of crystallized compounds of the acetic acid. By means of a second treatment with glacial acetic acid and chloroform the quantity of the beryllia obtained in a pure form is easily brought up to ninety-five per cent. The yield becomes still greater if the original material is poorer in alumina and iron. Instead of extracting the acetates by means of chloroform immediately after the treatment with glacial acetic acid water may first be added, which dissolves the acetate of iron and aluminium, but does not dissolve the acetate of beryllium, and then the extraction by means of chloroform may take place.

What we claim is—

1. The process of rendering beryllium hydroxid insoluble or soluble with difficulty not only in alkali but also in acids, which consists in heating beryllium hydroxid while in an undissolved condition.

2. The process of rendering beryllium hydroxid insoluble or soluble with difficulty not only in alkali but also in acids, which consists in heating beryllium hydroxid while in an undissolved condition and in an aqueous bath.

3. The process of rendering beryllium hydroxid insoluble or soluble with difficulty not only in alkali but also in acids, which consists in heating beryllium hydroxid while in an undissolved condition in the presence of an alkaline solution.

4. The process of rendering beryllium hydroxid insoluble or soluble with difficulty not only in alkali but also in acids, which consists in heating beryllium hydroxid while in an undissolved condition and in the presence of an alkali-carbonate solution.

5. The process of separating beryllium hydroxid from aluminium hydroxid which consists in heating a mixture containing beryllia and alumina while in an undissolved condition and then treating the mixture with an alkali-bath just sufficient to dissolve the alumina.

6. The process of separating beryllia from alumina, which consists in heating a mixture containing beryllia and alumina in an aqueous bath while in an undissolved condition and then treating the mixture with an alkali-bath just sufficient to dissolve the aluminium compound.

7. The process of separating beryllia from alumina, which consists in heating a mixture containing beryllia and alumina in the presence of an alkaline solution and while in an undissolved condition and then heating the mixture in an alkali-bath just sufficient to dissolve the aluminium compound.

8. The process of separating the hydroxids of beryllium and aluminium which consists in heating a mixture containing the two in the presence of an alkali-carbonate solution while in an undissolved condition and then heating the mixture in an alkali-bath just sufficient to dissolve the aluminium compound.

9. The process of separating the hydroxids of beryllium, aluminium and iron which consists in first heating the mixture of or containing these compounds while the beryllium hydroxid is in an undissolved condition and then heating the said mixture in dilute alkali just sufficient to dissolve the aluminium compound and then treating the undissolved residuum with acid to dissolve out the iron compound.

10. The process of separating beryllium hydroxid from iron hydroxid which consists in rendering the beryllium hydroxid insoluble or soluble with difficulty in acids by heating a mixture containing beryllium and iron hydroxid in the presence of an alkali solution and in an undissolved condition and then treating the mixture with acid for dissolving the iron compound.

11. The process of separating beryllium hydroxid from aluminium and iron hydroxids which consists in rendering the beryllium hydroxid insoluble in acids by heating the mixture of beryllium, aluminium and iron hydroxid in the presence of an alkali solution which is just sufficient to dissolve the aluminium compound and then treating the undissolved residuum with acid for dissolving the iron hydroxid.

12. The process of separating beryllium hydroxid from aluminium and iron hydroxid which consists in rendering the beryllium hydroxid insoluble in acids by heating the mixture of beryllium, aluminium and iron hydroxid in an aqueous bath while the beryllium hydroxid is undissolved and then in alkali solution just sufficient to dissolve the aluminium hydroxid and then treating the undissolved residuum with acid for dissolving the iron hydroxid.

13. The process of separating beryllium, aluminium and iron hydroxids which consists in heating a mixture of or containing these compounds while the beryllium compound is undissolved, in the presence of an alkali-carbonate bath, then heating the said mixture in alkali solution just sufficient to dissolve the aluminium compound and treating the undissolved residuum with acid to dissolve the iron compound.

14. The process of obtaining purified beryllium hydroxid from material containing the hydroxids of beryllium, aluminium and iron, which consists in first heating the mixture of or containing these compounds while the beryllium hydroxid is in an undissolved condition, then heating the said mixture in dilute alkali just sufficient to dissolve the aluminium compound, then treating the undissolved residuum with acid to dissolve out the iron compound, and purifying the resultant beryllium hydroxid as an acetate.

15. The process of obtaining purified beryllium hydroxid from material containing the hydroxids of beryllium, aluminium and iron, which consists in first heating the material while the beryllium hydroxid is in an undissolved condition, then heating said mixture in dilute alkali just sufficient to dissolve the aluminium compound, then treating the undissolved residuum with acid to dissolve out the iron compound, separating the beryllium hydroxid, dissolving it in acetic acid, evaporating the solution, treating it with glacial acetic acid and finally extracting the same with chloroform.

In testimony whereof we have signed this specification in the presence of two subscribing witnesses.

FRITZ HABER.
GABRIEL VAN OORDT.
FRIEDRICH BRAN.

Witnesses:
 H. W. HARRIS,
 JACOB ADRIAN.